United States Patent
Gartmann

(10) Patent No.: US 11,370,573 B2
(45) Date of Patent: Jun. 28, 2022

(54) METHOD FOR TESTING THE FUNCTION OF A TUBULAR BAG MACHINE

(71) Applicant: ROVEMA GMBH, Fernwald (DE)

(72) Inventor: Timo Gartmann, Lollar (DE)

(73) Assignee: ROVEMA GMBH, Fernwald (DE)

( * ) Notice: Subject to any disclaimer, the term of this patent is extended or adjusted under 35 U.S.C. 154(b) by 247 days.

(21) Appl. No.: 16/613,358

(22) PCT Filed: May 16, 2018

(86) PCT No.: PCT/EP2018/062682
§ 371 (c)(1),
(2) Date: Nov. 13, 2019

(87) PCT Pub. No.: WO2018/215256
PCT Pub. Date: Nov. 29, 2018

(65) Prior Publication Data
US 2021/0078745 A1 Mar. 18, 2021

(30) Foreign Application Priority Data
May 23, 2017 (DE) ...................... 10 2017 208 766.8

(51) Int. Cl.
*B65B 57/00* (2006.01)
*B29C 65/00* (2006.01)
(Continued)

(52) U.S. Cl.
CPC .......... *B65B 57/00* (2013.01); *B29C 66/4312* (2013.01); *B29C 66/82265* (2013.01);
(Continued)

(58) Field of Classification Search
CPC ..... B29C 65/02; B29C 65/18; B29C 66/1122; B29C 66/4312; B29C 66/83543;
(Continued)

(56) References Cited

U.S. PATENT DOCUMENTS 5,117,612 A * 6/1992 Keim ...................... B29C 65/18
53/451
5,439,539 A * 8/1995 McLean .................. B29C 66/96
156/64
(Continued)

FOREIGN PATENT DOCUMENTS

DE 69418297 T2 11/1999
DE 102007004140 A1 7/2008
(Continued)

OTHER PUBLICATIONS

Machine translation of DE 102013203295 date unknown.*

*Primary Examiner* — John L Goff, II
(74) *Attorney, Agent, or Firm* — Dickinson Wright PLLC; Andrew D. Dorisio

(57) ABSTRACT

A method for testing a tubular bag machine, the tubular bag machine having multiple electronic drive units controlled independently by a drive control system for driving functional elements of the packing machine in a cycle time-synchronous manner during predefined motion sequences, one drive unit being a transverse sealing unit comprising a motor and two transverse sealing jaws for transversely sealing a film tube, the drive torque being measured using a drive controller, and the position of the drive motor measured using a position sensor, by removing the film tube from the sealing zone between the transverse sealing jaws, closing the jaws according to a predefined target torque stored in the drive control system; measuring the actual position of the drive motor at the target torque; and comparing the measured actual position to a target position stored in the drive control system and associated with the predefined target torque.

13 Claims, 3 Drawing Sheets

(51) Int. Cl.
 B65B 51/30 (2006.01)
 B65B 65/02 (2006.01)
(52) U.S. Cl.
 CPC .......... *B29C 66/849* (2013.01); *B29C 66/876* (2013.01); *B29C 66/9241* (2013.01); *B29C 66/9261* (2013.01); *B29C 66/9292* (2013.01); *B29C 66/92211* (2013.01); *B29C 66/92311* (2013.01); *B29C 66/96* (2013.01); *B65B 51/303* (2013.01); *B65B 65/02* (2013.01)
(58) Field of Classification Search
 CPC .............. B29C 66/849; B29C 66/8246; B29C 66/82265; B29C 66/87; B29C 66/8511; B29C 66/876; B29C 66/872; B29C 66/43121; B29C 66/43122; B29C 66/43123; B29C 66/43129; B29C 66/832; B29C 66/834; B29C 66/8491; B29C 66/851; B29C 66/90; B29C 66/91212; B29C 66/91213; B29C 66/9192; B29C 66/92; B29C 66/922; B29C 66/9221; B29C 66/92211; B29C 66/9231; B29C 66/92311; B29C 66/924; B29C 66/9241; B29C 66/92431; B29C 66/92441; B29C 66/92443; B29C 66/92445; B29C 66/92451; B29C 66/9261; B29C 66/92611; B29C 66/92613; B29C 66/92615; B29C 66/92651; B29C 66/92653; B29C 66/92655; B29C 66/929; B29C 66/9292; B29C 66/92921; B29C 66/95; B29C 66/9592; B29C 66/96; B29C 66/961; B29C 66/963; B29C 66/91231; B65B 51/303; B65B 2051/105; B65B 57/00; B65B 57/18; B65B 65/02; B29L 2031/7128; B32B 41/00; B32B 2041/04; B32B 2041/06
 USPC ....... 156/64, 358, 359, 378; 53/75, 507, 451
 See application file for complete search history.

(56) References Cited

U.S. PATENT DOCUMENTS

| | | | |
|---|---|---|---|
| 5,551,206 A * | 9/1996 | Fukuda | B29C 65/18 53/75 |
| 5,653,085 A | 8/1997 | Suga | |
| 5,836,136 A * | 11/1998 | Highberger | B29C 66/4312 53/75 |
| 2010/0108249 A1 | 5/2010 | Hunnicutt et al. | |

FOREIGN PATENT DOCUMENTS

| | | | |
|---|---|---|---|
| DE | 102013203295 A1 | 8/2014 | |
| EP | 0368016 A2 | 5/1990 | |
| EP | 0865989 A2 | 9/1998 | |
| JP | 2006193176 A | 7/2006 | |
| WO | WO-9640558 A1 * | 12/1996 | ......... G05B 19/4062 |

* cited by examiner

METHOD FOR TESTING THE FUNCTION OF A TUBULAR BAG MACHINE

TECHNICAL FIELD

The invention relates to a method for testing the function of a tubular bag machine.

BACKGROUND OF THE INVENTION

Tubular bag machines are generically equipped with a drive control system which can control multiple electronic drive units independently of each other. This allows the different functional elements of the packing machine, in particular the sealing units, to be driven in a cycle time-synchronous manner as they are going through predefined motion sequences.

The method according to the invention is directed at testing the function of the transverse sealing unit of a tubular bag machine. The transverse sealing unit of generic tubular bag machines comprises at least one drive motor, such as a servomotor, a geared servomotor or a torque motor, which can be used to drive two transverse sealing jaws which are drivable relative to each other. Using the transverse sealing jaws, the film tubes are sealed transversely to the conveying direction when producing the tubular bags. To this end, the transverse sealing jaws are closed, thus clamping the film web of the tubular bag between them and sealing it through introduction of process heat. Generically, a drive motor equipped with a position sensor system is provided for driving the transverse sealing jaws. Furthermore, there is a drive controller, which is to be characterized very generally in that it can be used to directly or indirectly measure the drive torque produced by the drive motor. The drive controller can be used, for example, to measure the power consumption of the drive motor, and the drive torque of the drive motor can be derived from said value using the motor parameters.

The position sensor system is to be characterized very generally in that it can be used to directly or indirectly measure the position of the drive motor.

For the actual sealing process in the sealing zone between the two transverse sealing jaws, the sealing force acting between the transverse sealing jaws is a highly relevant process parameter for the compliance with the desired sealing quality. However, the sealing force between the two transverse sealing jaws can only be measured directly by means of complex sensor systems, which is why the drive torque of the drive motor is typically measured instead in known tubular bag machines. Since the drive torque is transmitted from the mechanical components of the transverse sealing unit to the transverse sealing jaws, the sealing force acting between the transverse sealing jaws can be derived from the respective drive torque of the drive motor using a transfer function which substantially represents the spring stiffness of the mechanical component of the transverse sealing unit. Oftentimes, the transfer functions to be used to characterize the mechanical properties of the transverse sealing unit translating the drive torque of the drive motor into the sealing force of the sealing jaws is determined experimentally. Once the transfer function is set, the tubular bag machine is then operated using said transfer function; however, errors and deviations of the transfer function will no longer be detectable in that case.

For instance, when the sealing tool in the transverse sealing jaws is replaced, varying installation conditions may cause the transfer function used to translate the drive torque into the sealing force to change because the new sealing tool has a different stiffness than the one used before, for example. Different installation conditions or the installation of new fitting aids, such as washers, may also lead to changes in the transfer function.

In the known tubular bag machines, these changes in the characteristics of the transfer function between the drive motor and the transverse sealing jaws cannot be detected, which is why an error analysis is often-times impossible in the event of disturbances of the packing process.

SUMMARY OF THE INVENTION

Hence, the object of the present invention is to propose a method for testing the function of a tubular bag machine by means of which changes of the transfer function between the drive motor and the transverse sealing unit can be detected.

Said object is attained by the teaching of the two independent main claims.

First of all, the method according to the invention is based on the film tube not being removed from the sealing zone between the transverse sealing jaws until the function test begins.

According to the first variation of the method according to the invention, the transverse sealing jaws are closed according to a preset target torque stored in the drive control system. Once the target torque has been reached, the actual position of the drive motor is then measured. Last, upon arrival at the target torque, said actual position of the drive motor is compared to a target position which is stored in the drive control system and which is associated with the predefined target torque. If the measured actual position measured upon arrival at the target torque deviates from the expected target position, it can be concluded that the transfer function between the drive motor and the transverse sealing unit has undergone an unexpected change, meaning that production should not continue using the transfer function present so far.

To ensure a more reliable diagnosis of the change in the transfer function between the drive motor and the transverse sealing unit, it is particularly advantageous for method steps b), c) and d) to be repeated one after the other for different target torques and their associated target positions.

The manner in which the target positions associated with the target torques are determined is basically optional. They can be determined particularly simply by first calibrating the transverse sealing unit together with the entire tubular bag machine, thereby setting known basic conditions for the operation of the tubular bag machine. In this calibrated operation, the transfer function between the drive motor and the transverse sealing unit can be considered known. Subsequently, the actual positions reached for different target torques are measured and the measured actual positions are then stored in the drive control system as target positions for the later function tests. This means that, eventually, an associated target position for each target torque will be stored in the drive control system.

Alternatively, the method according to the invention can also be performed by predefining a target position instead of a target torque for the closing of the transverse sealing jaws. Then, the actual torque produced by the drive motor upon arrival in the target position is measured and, last, said measured actual torque is compared to a target torque which is stored in the drive control system and which is associated with the predefined target position.

In this variation of the method, too, the diagnostic quality can be improved if multiple respective target torques are stored for multiple target positions in the drive control system and method steps b), c) and d) are repeated one after the other for the different target positions and their respective associated target torques.

The target torques associated with the predefined target positions can be recorded in this variation of the method, too, by recording the actual torques during operation of the calibrated tubular bag machine without a film tube.

The prevailing process temperature, in particular, has significant impact on the mechanical behavior of the translation of the of the drive torque of the drive motor into the sealing force of the sealing unit. This is because the mechanical strength of the components between the drive motor and the transverse sealing jaws either increases or lowers as a function of the respective temperature. Accordingly, this also changes the transfer function between the drive motor and the transverse sealing jaws. To eliminate this source of errors, it is particularly advantageous for the method according to the invention comprising method steps a), b), c) and d) to be carried out at a reference temperature which is stored in the drive control system. In particular, the method according to the invention comprising method steps a), b), c) and d) is advantageously carried out at room temperature.

The reference temperature will preferably correspond to the temperature at which the target positions and the target torques have been determined by measuring the actual positions and the actual torques of the calibrated transverse sealing unit, respectively.

In method step d) of the two methods according to the invention, the measured actual values are each compared to the expected target values for the position and the torque of the drive motor. To facilitate evaluation of the result of said comparison, the difference determined in method step d) between the target position and the actual position and between the target torque and the actual torque is particularly advantageously compared to a tolerance threshold stored in the drive control system. An error is reported only if the tolerance threshold is exceeded. This prevents very small deviations between the target value and the actual value from triggering error reports.

The manner in which the actual position of the drive motor is measured is basically optional. According to a preferred embodiment, the actual position is measured directly using a rotation angle sensor.

Furthermore, the manner in which the actual torque of the drive motor is measured is basically optional, as well. A particularly simple way to do so is to indirectly measure the drive controller. This is because drive motors according to the state of the art transmit the intended torque with high precision.

The methods according to the invention for testing the function of the transverse sealing unit of a tubular bag machine can be implemented at basically any time. Particularly advantageously, method steps a), b), c) and d) are carried out after replacement of the transverse sealing jaws. In this way, it can be ensured after replacement of the transverse sealing jaws that the installed transverse sealing jaws actually achieve the transfer function preset in the tubular bag machine for translating the drive torque of the drive motor into the sealing force of the transverse sealing jaws.

Method steps a), b), c) and d) of the two methods according to the invention should preferably also be carried out after disturbances in the operation of the tubular bag machines in order to identify or rule out the transverse sealing unit as a potential error source.

The methods according to the invention can be employed to test the function of both continuously operating tubular bag machines and intermittently operating tubular bag machines.

An embodiment of the invention is schematically illustrated in the drawings and will be explained by way of example below.

BRIEF DESCRIPTION OF THE DRAWING FIGURES

DETAILED DESCRIPTION OF THE INVENTION

Figure 1:
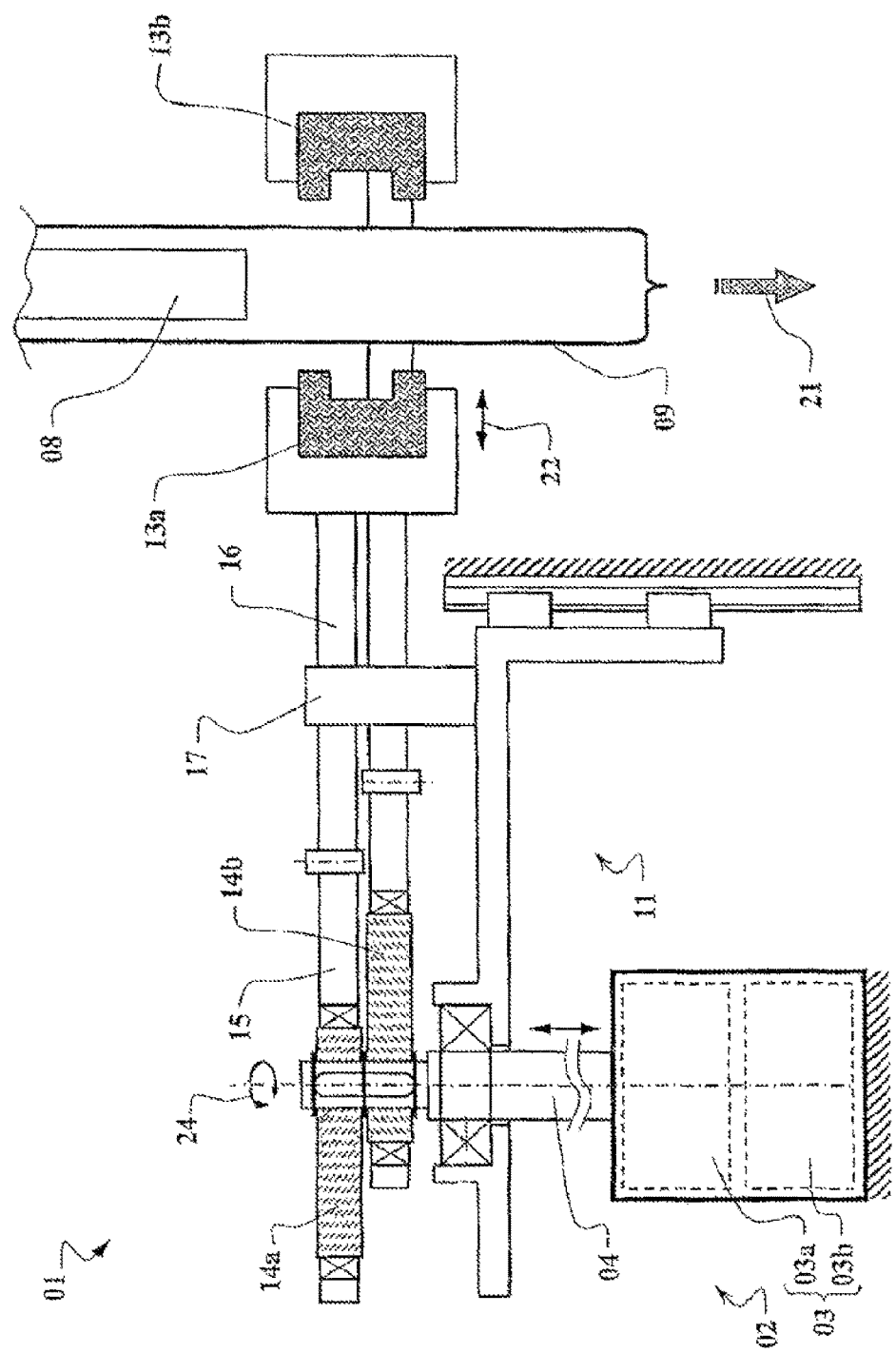
FIG. 1 shows a schematic side view of the transverse sealing unit of a known tubular bag machine.

FIG. 1 is a schematic of an example of the transverse sealing unit of a tubular bag machine comprising two transverse sealing jaws 13a and 13b which are moveable relative to each other.

An endlessly produced film tube 09 which can be filled with material to be packaged by means of a filling tube 08 is visible in FIG. 1. Film tube 09 is transported in conveying direction 21. To produce the individual tubular bags, film tube 09 is sealed transversely. Transverse sealing jaws 13a and 13b are used to do so. Said transverse sealing jaws 13a and 13b can be moved toward each other and away from each other in transverse direction 22 transversely to conveying direction 21. In the sealing position, transverse sealing jaws 13a and 13b are moved against each other so that film tube 09 located between them can be compressed and sealed by heating transverse sealing jaws 13a and 13b. The technique for the transverse sealing of tubular bags is known in principle and requires no further explanation.

In the exemplary embodiment illustrated in FIG. 1, transverse sealing jaws 13a and 13b are each disposed on support bars 16 which are mounted in a support bar mount 17 so as to be linearly displaceable in the transverse direction. Contrary movement of transverse sealing jaws 13a and 13b is realized by means of an eccentric mechanism. To this end, one eccentric element 14a and 14b per support bar 16 is mounted on drive shaft 04 so as to co-rotate therewith. In turn, a coupling element 15 which is connected to associated support bar 16 in a pivoting manner is mounted on each eccentric element 14a and 14b so as to rotate independently thereof. Thus, rotation 24 of drive shaft 04 and, simultaneously, of eccentric elements 14a and 14b can be translated into the alternating movement of respective support bars 16 and thus of transverse sealing jaws 13a and 13b.

Together with coupling element 15 and support bar 16, eccentric elements 14a and 14b disposed on drive shaft 04 form a translation mechanism which translates rotation 24 of drive shaft 04 into an alternating contrary movement of transverse sealing jaws 13a and 13b. The translation mechanism with transverse sealing jaws 13a and 13b is part of transverse sealing unit 11. A drive motor 02 comprising a base 03a and a stator 03b is provided for driving drive shaft 04. Drive motor 02 is realized in the manner of a drive motor in which the actual position, namely rotation angle φ, and actual torque M can be measured using a corresponding drive controller, which is not shown in FIG. 1.

Figure 2:
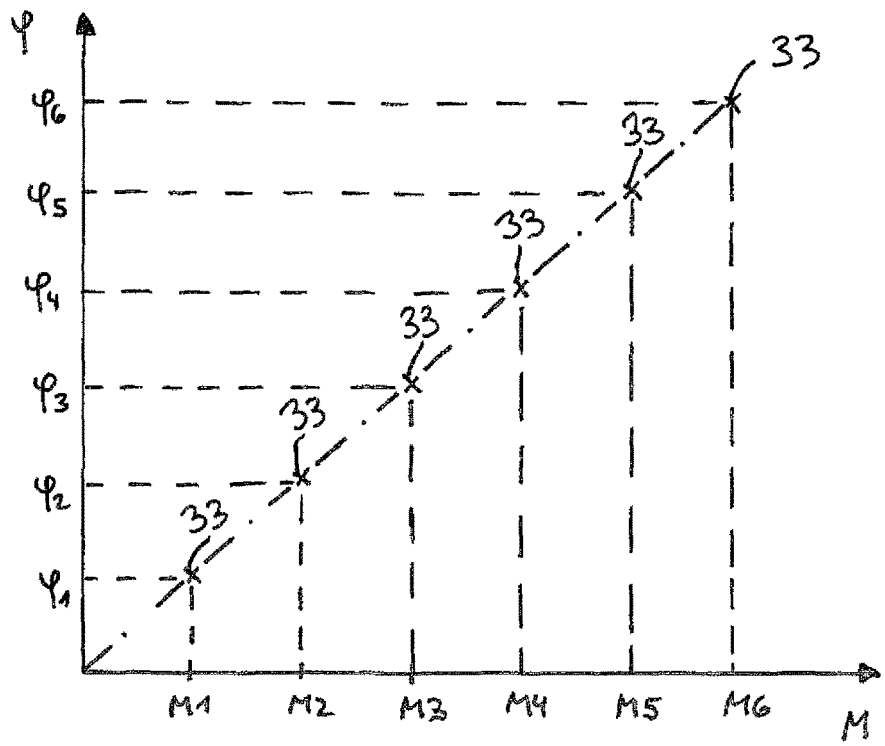
FIG. 2 shows a diagram relating to the determination of the target positions associated with the different target torques.

FIG. 2 shows a diagram relating to the recording of target positions, namely target rotation angles φ, each associated with a target torque M. To record the corresponding values of target rotation angles φ1 to φ6, the entire tubular bag machine including transverse sealing unit 01 is first calibrated and film tube 09 is removed from between transverse sealing jaws 13a and 13b. Then, the drive control system sets target torques M1, M2, M3, M4, M5 and M6, one after the other, for transverse sealing unit 01. Each time respective torque values M1 to M6 have been reached, actual rotation angle φ is determined by the position sensor system and determined actual rotation angle φ is stored in the drive control system as target rotation angle φ1 to φ6. As a result, a target rotation angle φ1 to φ6 is stored for each target torque M1 to M6 at the end of said determination process, the target torques and target rotation angles each forming value pairs. As illustrated in FIG. 2 in a schematic and exemplary manner, the value pairs displayed in the torque/rotation angle diagram all lie on one straight line. It is the slope of said straight line that represents the spring stiffness of the translation between the drive motor 02 and the transverse sealing jaws 13a and 13b.

Figure 3:
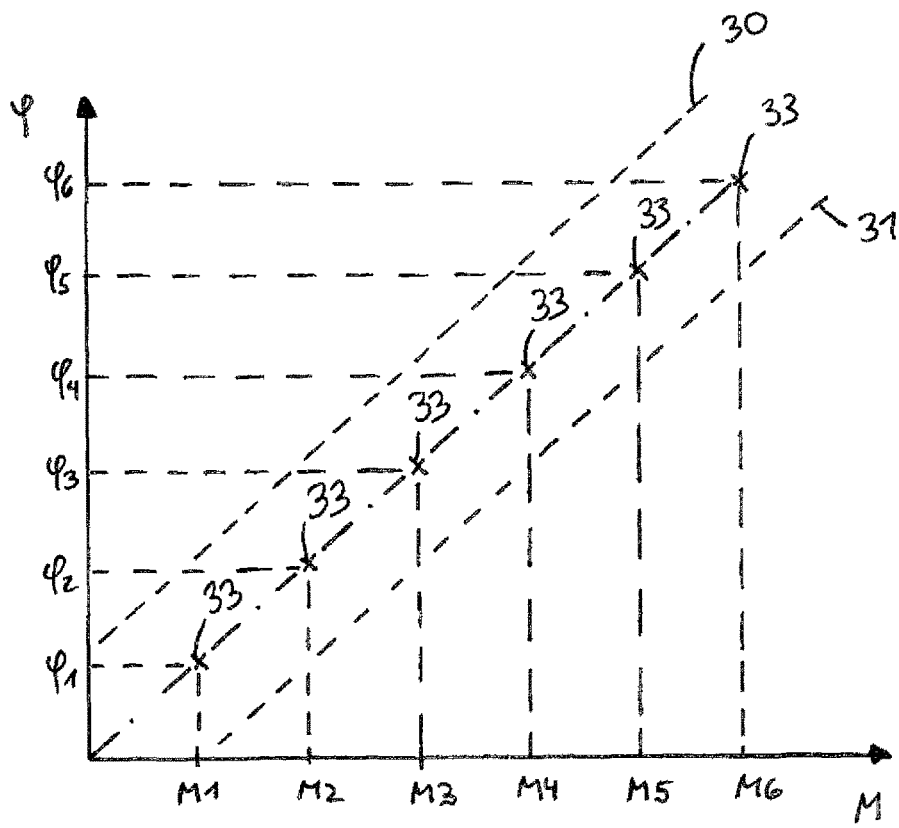
FIG. 3 shows the diagram according to FIG. 2 after implementation of tolerance thresholds.

FIG. 3 shows the diagram according to FIG. 2 with the addition of two tolerance thresholds 30 and 31. The two tolerance thresholds form a corridor around the straight line through the value pairs of target torques M1 to M6 and target rotation angles φ1 to φ6.

Figure 4:
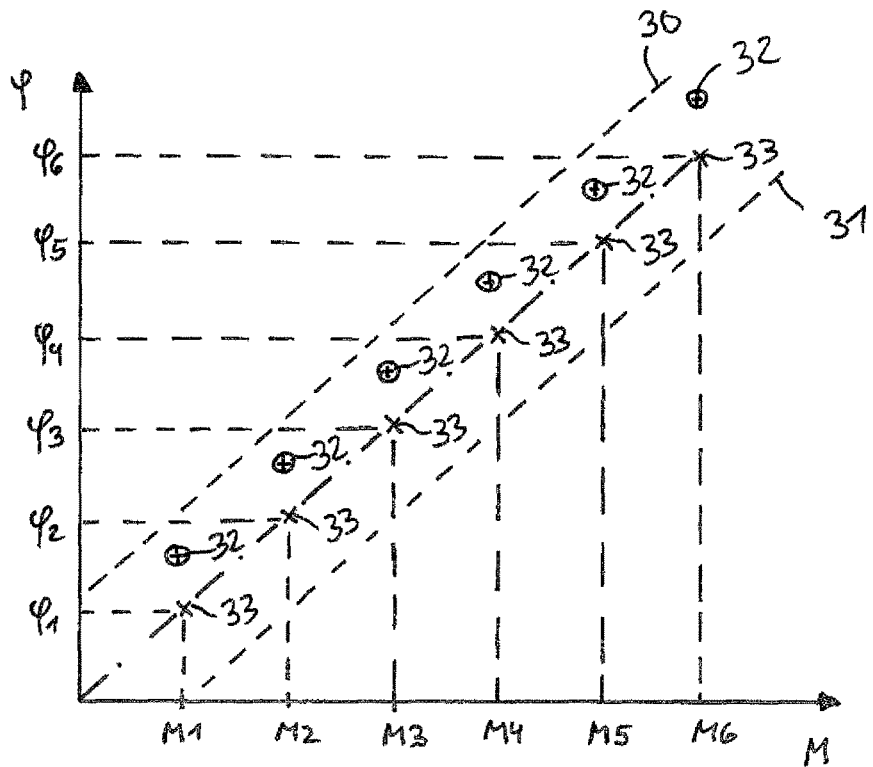
FIG. 4 shows the diagram according to FIG. 3 after determination of actual positions during a first function test.

The diagram illustrated in FIG. 4 shows the diagram according to FIG. 3 after a first function test has been performed. In this function test, film tube 02 is again removed from between transverse sealing jaws 13a and 13b and the transverse sealing jaws are closed. Then, target torques M1 to M6 are output by drive motor 02 one after the other and the resulting actual rotation angle of drive motor 02 is measured each time. Corresponding value pairs 32 are marked by a circle in FIG. 4. As can be seen, the six value pairs 32 resulting during the function test all lie on a straight line that is shifted upward parallel to the straight line running through value pairs 33 composed of the target torque and the target rotation angle (see FIG. 3). This parallel shift of the spring line may be due to the fact that the installation of a new transverse sealing tool caused a slightly different distance between transverse sealing jaws 13a and 13b. However, since value pairs 32 are all located within the corridor between tolerance thresholds 30 and 31, no error has to be reported.

Figure 5:
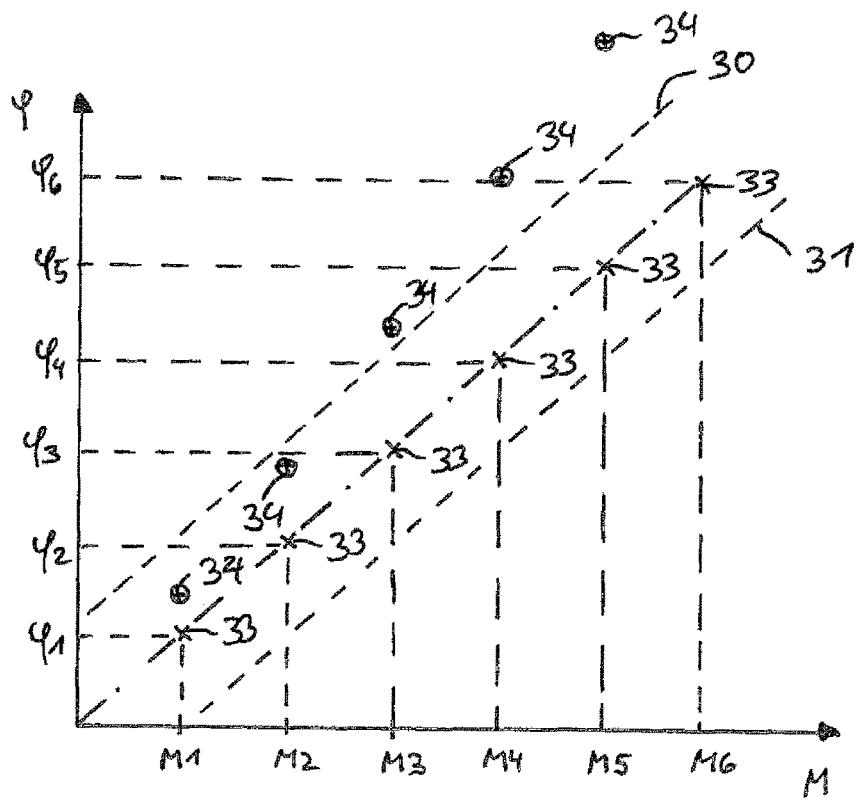
FIG. 5 shows the diagram according to FIG. 3 after determination of actual positions during a second function test.

FIG. 5 shows value pairs 34 of a second function test, which represents the actual position, namely the actual rotation angle, together with the respective target torque M1 to M6 produced. As can be seen, value pairs 34, too, all lie on one straight line, said straight line having a different slope than the straight line through value pairs 33 composed of the target torque and the target rotation angle. Said different slope of the spring line through value pairs 34 may be due, for example, to the installation of a stiffer component, such as a slightly stiffer transverse sealing tool. Since the upper three value pairs 34 are located outside of the corridor between tolerance thresholds 30 and 31, an error is reported in this case, so that operating personnel can perform an error diagnosis.

The invention claimed is:

1. A method for testing the function of a tubular bag machine, the tubular bag machine comprising a drive control system and multiple electronic drive units which are controlled independently of each other by the drive control system and which drive different functional elements of the tubular bag machine in a cycle time-synchronous manner as they are going through predefined motion sequences, and one drive unit being realized in the manner of a transverse sealing unit, and the transverse sealing unit comprising at least one drive motor (02) and two transverse sealing jaws (13a, 13b) which are driven relative to each other by the drive motor (02) and by means of which a film tube (09) is sealed transversely to a conveying direction (21), and a drive torque (M) of the drive motor (02) being measured directly or indirectly using a drive controller, and a position (φ) of the drive motor (02) being measured directly or indirectly using a position sensor, the method comprising the following steps:
   a) removing the film tube (09) from a sealing zone between the transverse sealing jaws (13a, 13b);
   b) closing the transverse sealing jaws (13a, 13b) according to a predefined target torque stored in the drive control system;
   c) measuring an actual position of the drive motor (02) once the target torque has been reached;
   d) comparing the measured actual position to a target position stored in the drive control system and associated with the predefined target torque;
   wherein multiple different target torques each having an associated target position are stored in the drive control system, method steps b), c) and d) being repeated one after the other for the different target torques and their associated target positions.

2. The method according to claim 1, characterized in that to determine the target positions, the transverse sealing unit is first calibrated, and then the actual positions reached are measured for different target torques, the actual positions thus measured being stored in the drive control system as target positions associated with the respective target torques.

3. The method according to claim 1, characterized in that method steps a), b), c) and d) are carried out at a reference temperature stored in the drive control system.

4. The method according to claim 3, characterized in that the reference temperature corresponds to a measured temperature at which the target positions or the target torques were determined by measuring actual positions of the transverse sealing unit.

5. The method according to claim 1, further comprising determining a difference between the target position and the actual position and comparing said difference to a tolerance threshold (30, 31) stored in the drive control system, an error being reported if the tolerance threshold (30, 31) is exceeded.

6. The method according to claim 1, characterized in that the actual position is measured directly using a rotation angle sensor.

7. The method according to claim 1, characterized in that method steps a), b), c) and d) are carried out after the transverse sealing jaws have been replaced.

8. The method according to claim 1, characterized in that method steps a), b), c) and d) are carried out after a disruption of the operation of the tubular bag machine.

9. The method according to claim 1, characterized in that the drive units go through a motion sequence for the intermittent production of tubular bags.

10. The method according to claim 1, characterized in that the drive units go through a motion sequence for the continuous production of tubular bags.

11. A method for testing the function of a tubular bag machine, the tubular bag machine comprising a drive control system and multiple electronic drive units which are controlled independently of each other by the drive control system and which drive different functional elements of the tubular bag machine in a cycle time-synchronous manner as they are going through predefined motion sequences, and one drive unit being realized in the manner of a transverse sealing unit, and the transverse sealing unit comprising at least one drive motor (02) and two transverse sealing jaws (13*a*, 13*b*) which are driven relative to each other by the drive motor (02) and by means of which a film tube (09) is sealed transversely to a conveying direction (21), and a drive torque (M) of the drive motor (02) being measured directly or indirectly using a drive controller, and a position (q) of the drive motor (02) being measured directly or indirectly using a position sensor, the method comprising the following steps:
   a) removing the film tube (09) from a sealing zone between the transverse sealing jaws (13*a*, 13*b*);
   b) closing the transverse sealing jaws (13*a*, 13*b*) according to a predefined target position stored in the drive control system;
   c) measuring an actual torque of the drive motor once the target position has been reached;
   d) comparing the measured actual torque to a target torque stored in the drive control system and associated with the predefined target position;
   wherein multiple different target positions each having an associated target torque are stored in the drive control system, method steps b), c) and d) being repeated one after the other for the different target positions and their associated target torques.

12. The method according to claim 11, characterized in that to determine the target torques, the transverse sealing unit is first calibrated, and then the actual torques reached are measured for different target positions, the actual torques thus measured being stored in the drive control system as target torques associated with the respective target positions.

13. The method according to claim 11, characterized in that the actual torque is measured indirectly by the drive controller of the drive motor (02).

\* \* \* \* \*